United States Patent [19]

Tadokoro et al.

[11] Patent Number: 5,456,878
[45] Date of Patent: Oct. 10, 1995

[54] METHOD OF PRODUCING SINTERED POROUS ANODE BODY FOR SOLID ELECTROLYTIC CAPACITOR AND SINTERING APPARATUS THEREOF

[75] Inventors: Hirokazu Tadokoro; Arihiro Goto, both of Tokyo, Japan

[73] Assignee: NEC Corporation, Japan

[21] Appl. No.: 801,543

[22] Filed: Dec. 2, 1991

[30] Foreign Application Priority Data

Nov. 30, 1990 [JP] Japan .................................. 2-340921

[51] Int. Cl.$^6$ .................................................. B22F 3/12
[52] U.S. Cl. ................................ 419/38; 419/57; 419/60
[58] Field of Search .............................. 419/56, 57, 58, 419/59, 60, 38

[56] References Cited

U.S. PATENT DOCUMENTS

| | | | |
|---|---|---|---|
| 1,040,699 | 10/1912 | Ladoff | 419/39 |
| 1,648,962 | 11/1927 | Rentschler et al. | 419/37 |
| 1,731,255 | 10/1929 | Marden | 419/56 |
| 1,752,877 | 4/1930 | Alterthum | 419/56 |
| 2,709,651 | 5/1955 | Gurnick et al. | 75/222 |
| 3,444,925 | 5/1969 | Johnson | 165/166 |
| 4,758,272 | 7/1988 | Pierotti et al. | 75/246 |
| 4,871,621 | 10/1989 | Bagley et al. | 428/549 |
| 4,923,512 | 5/1990 | Timm et al. | 75/239 |
| 5,093,076 | 3/1992 | Young et al. | 419/12 |
| 5,151,247 | 9/1992 | Haglund et al. | 419/13 |
| 5,162,099 | 11/1992 | Meyer et al. | 419/25 |
| 5,174,952 | 12/1992 | Jongenburger et al. | 419/23 |
| 5,225,155 | 7/1993 | Hampton et al. | 419/56 |
| 5,238,883 | 8/1993 | Newkirk et al. | 501/87 |
| 5,246,504 | 9/1993 | Ohta et al. | 136/201 |
| 5,266,264 | 11/1993 | Miura et al. | 419/37 |
| 5,304,343 | 4/1994 | Miura et al. | 419/39 |

OTHER PUBLICATIONS

Hausner et al, "Modern Developments In Powder Metallurgy" vol. 9, 1976, pp. 213–221, 253–263; MPIF.
Sands et al, "Powder Metallurgy: Practice and Applications," George Newnes Ltd., 1966, pp. 102–107.
German, Randal M., "Powder Metallurgy Science," MPIF, 1984, pp. 189–194.
Lenel, Fritz V., "Powder Metallurgy: Principles and Applications," MPIF, 1980, pp. 190–199.
Jones, W. D., "Fundamental Principles of Powder Metallurgy," pp. 440–441, 574–579, 583, 748; Edward Arnold Pub., 1960.

Primary Examiner—Donald P. Walsh
Assistant Examiner—Daniel Jenkins
Attorney, Agent, or Firm—Laff, Whitesel, Conte & Saret, Ltd.

[57] ABSTRACT

In a producing process of a sintered porous anode body of valve-metal for a solid-state electrolytic capacitor, molded pieces of the powder of valve-metal is sintered at a high temperature and at a lowered pressure in an atmosphere of an inert gas supplied at a fixed flow rate. Thanks to the usage of the inert gas, partial pressures of impurity elements can be suppressed and a gas emitted from the molded pieces in the sintering process can be washed out. Consequently, there is obtained a solid-state electrolytic capacitor in which the lead wire of the anode body is not easily bent down and which has a reduced leakage current and an increased withstand voltage.

8 Claims, 4 Drawing Sheets

1

METHOD OF PRODUCING SINTERED POROUS ANODE BODY FOR SOLID ELECTROLYTIC CAPACITOR AND SINTERING APPARATUS THEREOF

BACKGROUND OF THE INVENTION

1. Field of the Invention

The present invention relates to a method of producing a sintered porous anode body for a solid electrolytic capacitor and a sintering apparatus thereof, and more particularly, to a method of producing a sintered porous anode body of valve-metal.

2. Description of the Prior Art

A solid electrolytic capacitor comprises a sintered porous anode body of valve-metal such as tantalum and aluminum. A conventional sintered porous anode body is produced in such a manner that powder of the valve-metal is first molded under pressure so as to form through a pressurized molding process a molded piece which has a predetermined contour. A anode lead wire made of the valve-metal is implanted into the molded piece. The molded pieces are then placed on a sintering tray in an aligned condition or at random to be sintered in a vacuum state ranging from $10^{-5}$ to $10^{-6}$ Torr at a temperature ranging from 1500° C. to 1800° C. In the sintering process, in order to efficiently exhaust an impurity gas emitted from the molded pieces to attain a desired vacuum state with a lowered pressure, there has been necessitated a sintering apparatus including such large-sized exhausting machines for developing the vacuum state as a diffusion pump and a cryopump as shown in FIG. 5.

Since the valve-metal is in a state of a very fine powder, there is attained a large surface area of the metal powder particles to be formed into molded pieces. In consequence, when the valve-metal powder is sintered at a high temperature in the conventional method of sintering an anode body, the amount of the impurity gas emitted from the molded pieces is increased, making it difficult to keep a desired high vacuum of a lowered pressure. Resultantly, a solid electrolytic capacitor having the conventional sintered anode body is attended with deterioration in electric characteristics such as an increase in the leakage current or a decrease in the withstand voltage and in mechanical characteristics, for example, the lead wire is easily bent down.

Moreover, due to the necessity of the usage of large-sized exhausting machines for the vacuum, a long period of time is to be elapsed when starting and/or stopping the operation of these machines, which leads to a decrease in the operation efficiency; furthermore, due to the complexity of the configuration of the exhausting system, the maintainability is decreased and the probability of failure is increased.

SUMMARY OF THE INVENTION

It is therefore an object of the present invention to provide a method of and an apparatus for producing a sintered porous anode body for a solid-state electrolytic capacitor in which the influence of the impurity gas emitted from the molded piece in the sintering of the anode body is minimized to produce the sintered porous anode body with a high quality.

In accordance with the present invention, the method of producing a sintered porous anode body of valve-metal for a solid-state electrolytic capacitor comprises a molding process of molding powder of valve-metal into a molded piece, and a sintering process of sintering the molded piece at a high temperature in an inert gas atmosphere at a lowered pressure.

Moreover, the apparatus for producing a sintered porous anode body of valve-metal for a solid-state electrolytic capacitor in which the molded piece of powder of the valve-metal is sintered includes a vacuum sintering container for housing therein a sintering tray on which the molded pieces are to be mounted and sintering the molded pieces placed on the sintering tray in a state of a lowered pressure, pressure decreasing means for minimizing a pressure in the vacuum sintering container, inert gas supplying means for supplying an inert gas to the vacuum sintering container, and exhausting means for exhausting a gas from the vacuum sintering container. The pressure decreasing means lowers the pressure in the vacuum sintering container and the inert gas supplying means supplies the inert gas to the vacuum sintering container such that the molded pieces are sintered in the inert gas atmosphere at a lowered pressure.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
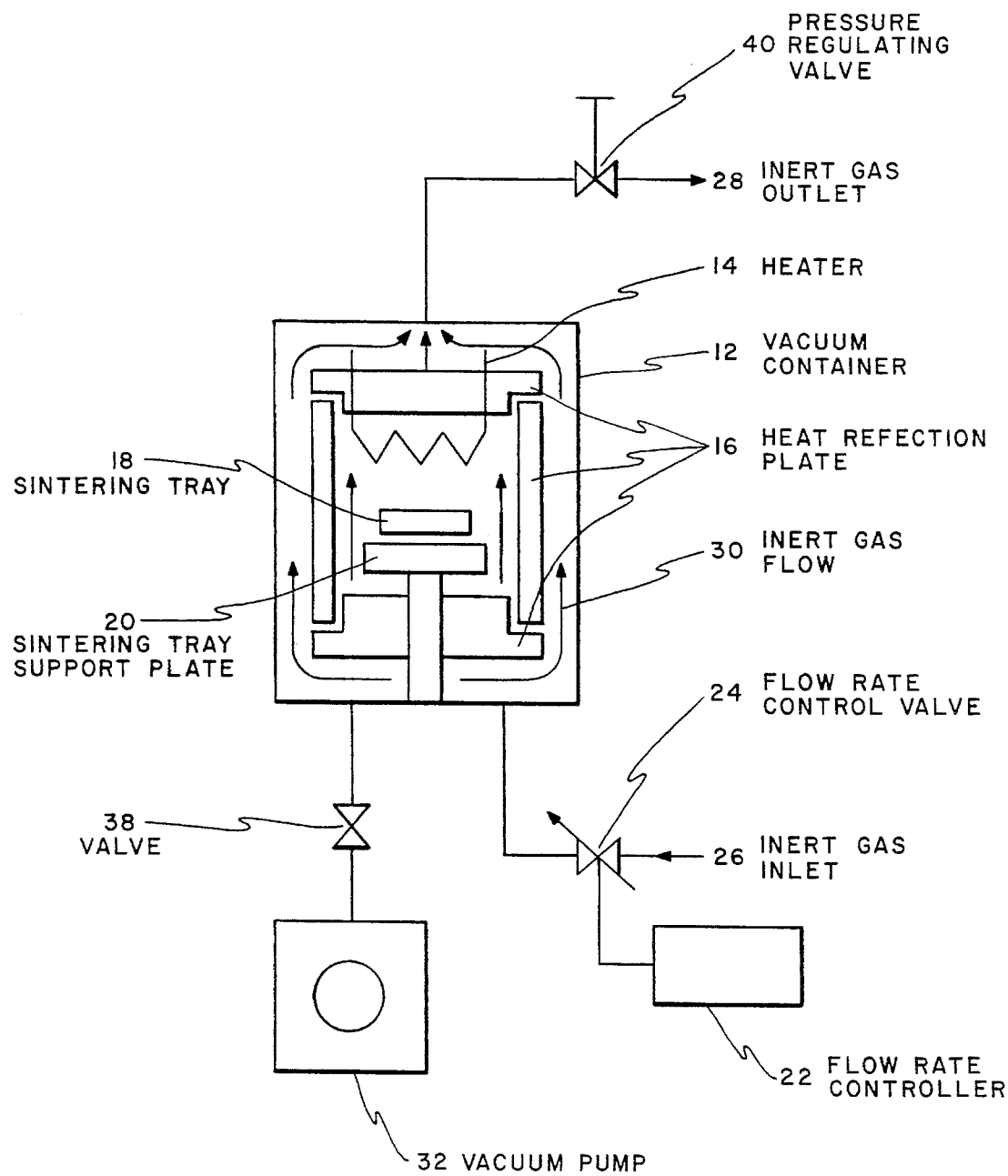
FIG. 1 is a schematic diagram showing the constitution of a sintering apparatus in accordance with the present invention.

Referring to FIG. 1, a sintering tray support plate 20 is disposed in a vacuum sintering container 12, and a sintering tray or saucer 18 is mounted on the sintering tray support plate 20. Molded pieces are laid in piles on the sintering tray 18. Moreover, a heat reflection plate 16 and a heater 14 are disposed in the vacuum sintering container 12.

The vacuum sintering container 12 is coupled with a vacuum pump 32 via a valve 38. The vacuum pump 32 is employed to exhaust gas from the vacuum sintering container 12 to obtain a vacuum state at a predetermined pressure. Moreover, the vacuum sintering container 12 is linked with an inert gas inlet 26 via a flow rate control valve 24. In this system, argon gas in which the content of argon is 99.995% is supplied from the inert gas inlet 26. The flow rate control valve 24 is connected to a flow rate controller 22, which controls a flow rate of an inert gas fed to the vacuum sintering container 12. The vacuum sintering container 12 is further linked with an inert gas outlet 28 via a pressure regulating valve 40, which controls a flow rate of an inert gas exhausted from the inert gas outlet 28, thereby keeping a predetermined pressure in the vacuum sintering container 12.

The sintering method will now be described.

After the sintering tray 18 on which molded pieces of powder of valve-metal (not shown) are mounted in piles is placed on the sintering tray support plate 20 in the vacuum sintering container 12, the vacuum container 12 is hermetically sealed. The valve 38 is then set to an open state such that the vacuum pump 32 exhausts gas from the vacuum container 12 to attain a vacuum state of about 0.5 Torr in the vacuum sintering container 12.

Subsequently, the valve 38 is set to a closed state and then the flow rate controller 22 and the flow rate control valve 24 are regulated so that the argon gas is supplied from the inert gas inlet 26 into the vacuum sintering container 12. The flow rate controller 22 is first adjusted to set the flow rate of the argon gas entering from the inert gas inlet 26 to three litters per minute (l/m) and then the pressure regulating valve 40 is controlled so that a pressure in the vacuum container 12 measured by a manometer (not shown) is about 1 Torr, thereby exhausting the inert gas.

In a state where the pressure and the flow rate are kept retained as above, the heater 14 heats the molded pieces up to a maximum temperature 1800° C. After the heating is finished, the sintered items are cooled down to the room temperature and are then removed from the vacuum sintering container 12. Through the sequence of operations above, the sintering process is finished.

In accordance with the present invention, since the inert gas is supplied at a fixed flow rate, the partial pressures of impurity elements can be suppressed and the impurity gases emitted from the molded pieces during the sintering process can be washed out, thereby attaining a capacitor of which the lead wire is not easily bent down and which has a small leakage current and a high withstand voltage.

Figure 2:
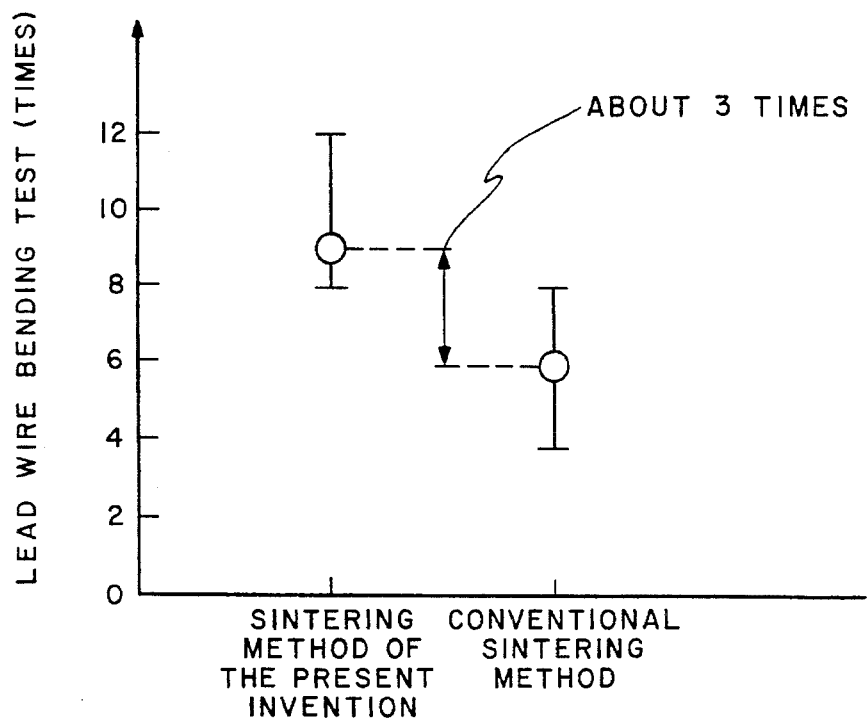
FIG. 2 is a graph showing lead wire bending test results of anode bodies produced in accordance with the present invention in comparison with those of anode bodies manufactured in the conventional method.
Figure 3:
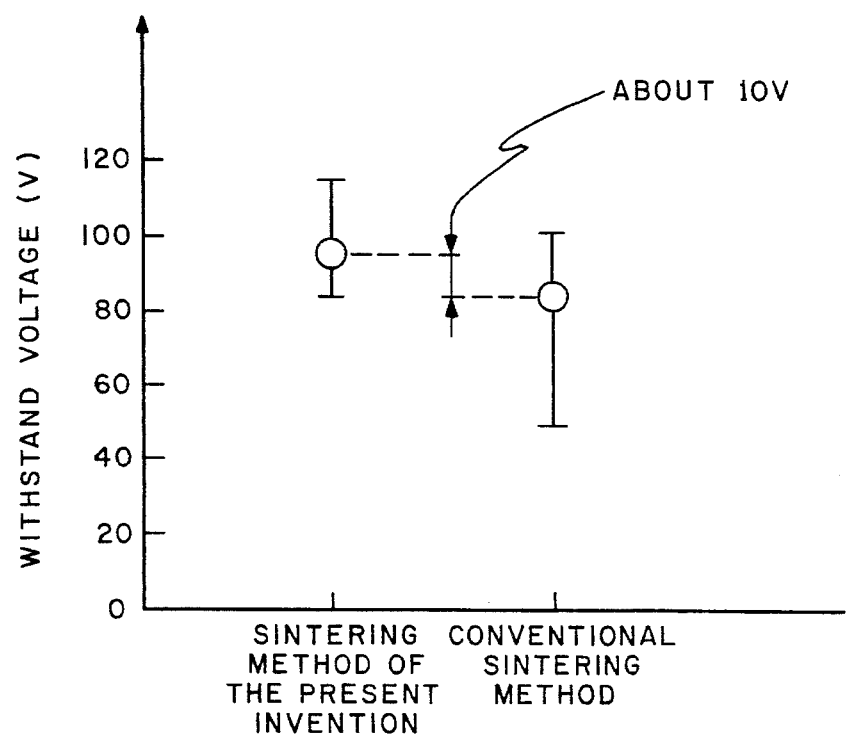
FIG. 3 is a graph showing the withstand voltage of anode bodies produced in accordance with the present invention in comparison with those of anode bodies manufactured in the conventional method.
Figure 4:
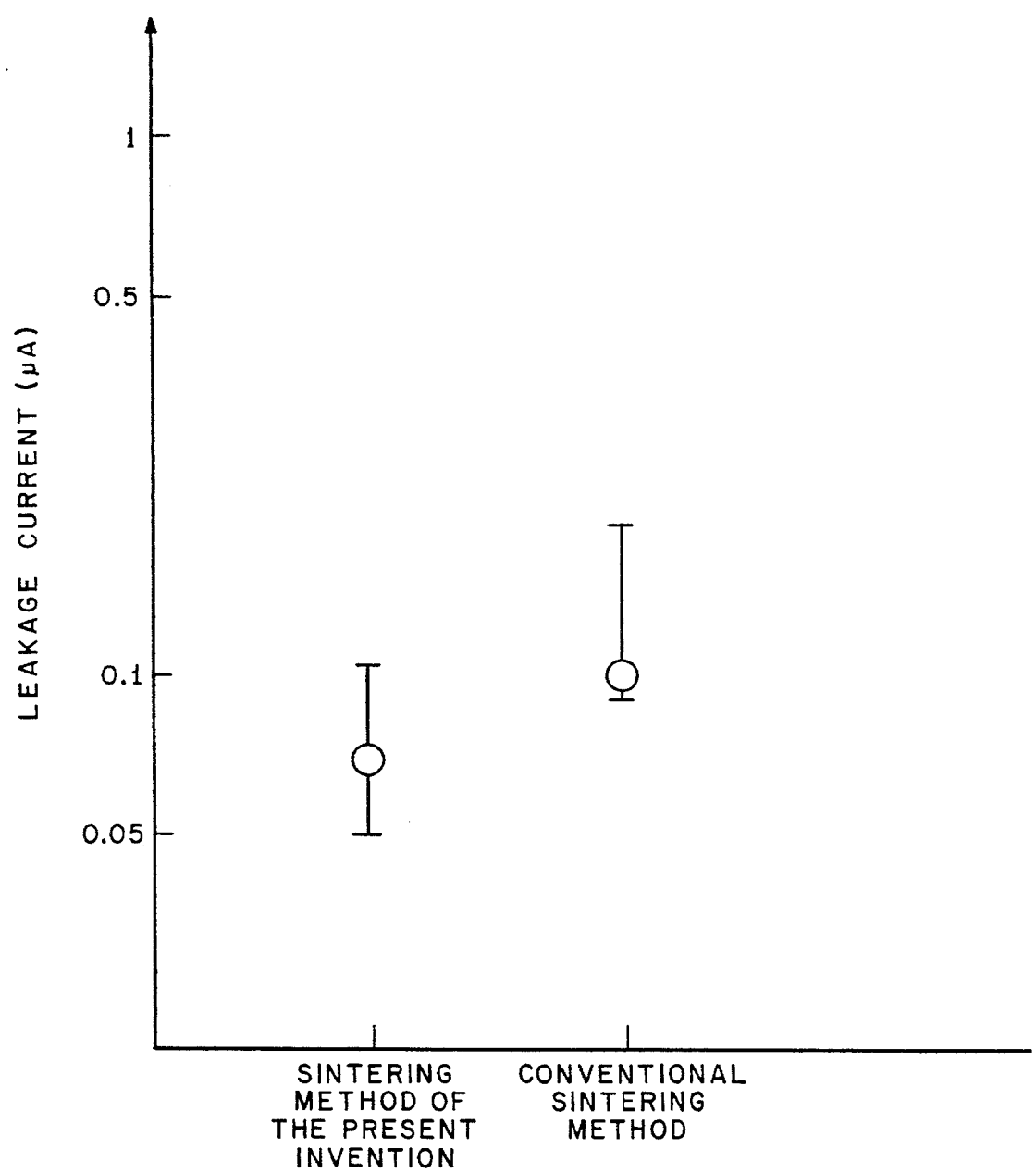
FIG. 4 is a diagram showing the leakage current of capacitors produced in accordance with the present invention in association with those of capacitors manufactured in the conventional method.
Figure 5:
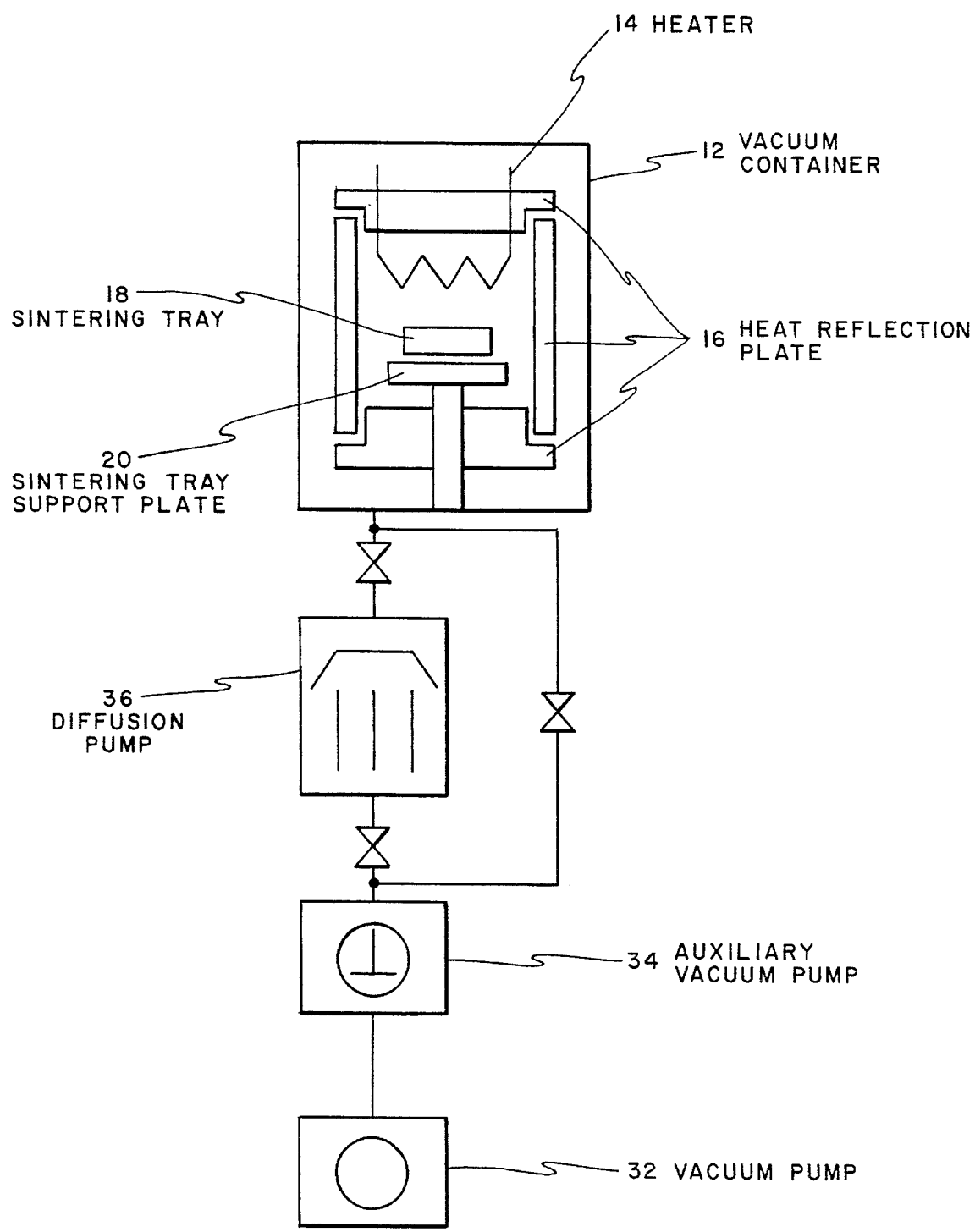
FIG. 5 is a diagram showing the system constitution of a conventional sintering apparatus.

FIGS. 2 to 4 are graphs showing characteristics attained from sintered pieces prepared at a heating temperature 1800° C. in the sintering method of the present invention and/or samples of anode bodies and capacitors including the sintered pieces in comparison with those of conventional examples.

FIG. 2 shows results of comparisons between strengths measured in the lead wire bending tests conducted on 20 anode body samples immediately after the sintering and those of anode bodies created in the conventional sintering method. As can be appreciated from the graph, the anode bodies sintered in accordance with the present invention are bent down through 8 to 12, namely, about nine bending operations on average; whereas, the anode bodies sintered in the conventional sintering method are bent down through four to eight, namely, about six bending operations on average. That is, the difference therebetween is three (bending operations) and hence the lead wire bending strength of the anode body prepared in accordance with the present invention is improved by about 50% as compared with that of the anode body fabricated in the conventional sintering method.

FIG. 3 shows withstand voltages measured on 20 anode body samples which are formed with an anodization voltage 100 V immediately after the sintering in comparison with those obtained from anode bodies created in the conventional sintering method. As can be seen from the graph, the anode bodies sintered in accordance with the present invention have a withstand voltage ranging from 85 to 115 V, namely, about 95 V on average. On the other hand, the anode bodies sintered in the conventional sintering method have a withstand voltage ranging from 50 V to 105 V, namely, about 85 V on average. The difference between the average withstand voltages is resultantly about ten volt, namely, the withstand voltage of the anode bodies manufactured in the sintering method according to the present invention is increased by about ten percent as compared with that of the anode bodies prepared in the sintering method of the prior art.

FIG. 4 shows leakage current values measured on 20 solid-state electrolytic capacitors each using an anode body produced in the sintering method in accordance with the present invention in comparison with those obtained from solid-state electrolytic capacitors created through the conventional sintering method. The capacitors each using the anode body sintered in accordance with the present invention develop a leakage current ranging from 0.05 to 0.1 microampere, namely, about 0.06 microampere on average. In contrast thereto, the capacitors each including the anode body sintered in the sintering method of the prior art develop a leakage current ranging from 0.09 to 0.25 microampere, namely, about 0.1 microampere on average. Resultantly, the leakage current of the capacitors using anode bodies prepared through the sintering method in accordance with the present invention is reduced by about 40% as compared with that of the capacitors fabricated in the conventional sintering method.

As described above, in accordance with the present invention, since the inert gas is supplied to the vacuum sintering container to suppress the partial pressures of impurity elements and the impurity gases generated from the molded pieces during the sintering process can be washed out, there can be obtained a capacitor of which the lead wire of the anode body is not easily bent down and which has a small leakage current and a high withstand voltage.

In addition, the apparatus of the present invention unnecessitates the large-sized exhausting machines for a desired vacuum state, the following advantageous effects can be attained.

The apparatus requires a small installation space and hence the floor utilization efficiency is improved.

The apparatus can be started and stopped in a reduced period of time; consequently, the operation efficiency of the apparatus is improved.

The exhausting system is simplified in the configuration thereof, namely, the maintainability of the apparatus is improved and the chance of failures is minimized.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A method of producing a sintered porous anode body of tantalum for a solid-state electrolytic capacitor comprising the steps of:

molding tantalum powder into a molded piece with tantalum lead wire implanted therein;

placing said molded pieces within a vacuum container;

heating said molded piece placed in said vacuum container up to a maximum temperature of 1800° C.; and supplying inert gas into said vacuum container at a fixed flow rate per unitary period of time so as to wash out impurity gases emitted from said molded pieces.

2. A method in accordance with claim 1, wherein said fixed flow rate is three liters per minute.

3. A method in accordance with claim 1, wherein said inert gas is argon.

4. A method in accordance with claim 1, wherein a pressure within said vacuum container is about 1 Torr.

5. A method of producing a sintered porous anode body of valve-metal for a solid-state electrolytic capacitor, the method comprising the steps of:

molding valve-metal powder into a molded piece with a valve-metal lead wire implanted therein;

placing said molded piece into a sintering container;

sealing said sintering container hermetically;

exhausting gas from said sintering container to attain a vacuum state in said sintering container;

supplying inert gas into said sintering container;

controlling a pressure in said sintering container such that said inert gas is exhausted from said sintering container so as to fix a flow rate of said inert gas within said sintering container; and sintering said molded piece placed in said sintering container, thereby washing out impurity gases emitted from said molded piece during said sintering.

6. A method in accordance with claim 5, wherein said molded piece is heated up to a maximum temperature of 1800° C. at said sintering step.

7. A method in accordance with claim 5, wherein said vacuum state is about 0.5 Torr.

8. A method of producing a sintered porous anode valve-metal body for a solid-state electrolytic capacitor, said method comprising the steps of:

molding valve-metal powder into a molded piece with a valve-metal lead wire implanted therein;

placing said molded piece into a sintering container;

supplying inert gas into said sintering container at a fixed flow rate;

controlling a pressure in said sintering container such that said inert gas is exhausted from said sintering container so as to fix a flow rate of said inert gas within said sintering container; and heating said molded piece placed in said sintering container up to a maximum temperature of 1800° C.

* * * * *